Jan. 18, 1966   R. J. FRASER ETAL   3,229,476
DISCHARGE HEAD FOR DISPENSING FREEZER
Filed Oct. 2, 1964   2 Sheets-Sheet 1

INVENTORS
RAYMOND J. FRASER
BERTOLD J. STAPF
LUDWIG M. RIPPLE
BY
ATT'Y.

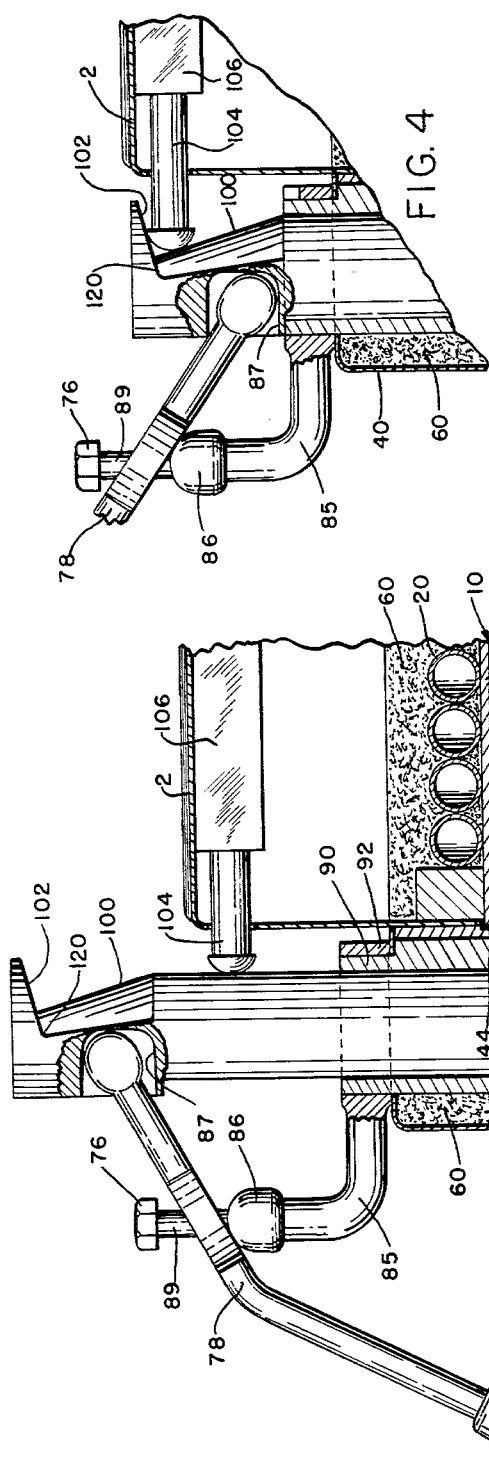

United States Patent Office 3,229,476
Patented Jan. 18, 1966

3,229,476
DISCHARGE HEAD FOR DISPENSING FREEZER
Raymond J. Fraser, River Edge, N.J., and Bertold J. Stapf, Long Island City, and Ludwig M. Ripple, Bronx, N.Y., assignors, by mesne assignments, to The Bastian-Blessing Company, Chicago, Ill., a corporation of Illinois
Filed Oct. 2, 1964, Ser. No. 400,974
9 Claims. (Cl. 62—267)

This invention relates to ice cream freezers for intermittently dispensing soft ice cream as individual servings and more particularly to the discharge head and valve control construction thereof that is exposed to atmosphere at the dispensing end of the freezer.

Commercial freezers for making and dispensing soft ice cream at dairy bars must comply with strict laws on sanitation and the product should be contamination free in the dispensing operation. Freezers also must be easily operated and cleaned regularly by operators that may be unskilled mechanically. For these reasons the freezing cylinder is preferably disposed horizontally and the freezer head and dispensing control valve are generally made as a closure unit at the front end for removal, ready disassembly and washing. The unit not only provides a journal for the front end of a beater mechanism but also affords a full opening at the front end of the freezing cylinder for immediate removal and return of the beater mechanism in the freezing cylinder. Moreover, the valve parts themselves must be readily separable with full access to all passages in the unit for brush cleaning.

Thus, because of the removability and ready disassembly, the head unit cannot be refrigerated directly and being of metal it presents internally a large heat loss area for the contents of the freezer at the dispensing end of the cylinder where the temperature is particularly critical for the soft ice cream being dispensed. The head unit also externally presents a large chilled area which collects moisture and frost that interferes with operation and presents a danger of contamination. These difficulties cannot be corrected merely by adjustments of the automatic temperature controls, particularly where the intermittent operation is irregular or where there are long lapses between dispensing operations during business lulls, but rather require constant attention and adjustment by an experienced operator.

In recent years, some effort has been made to activate the beater mechanism and the refrigeration system when the dispensing valve is opened each time so that the soft ice cream that may have become warm next to the head is supplied with chilled ice cream from deeper within the freezing cylinder. This however does not change the softness of warmer ice cream already present in the valve passages. Moreover, the chilled ice cream is only mixed with the warmer ice cream present at the head unit and accordingly is only partially affected thereby during the first few dispensing operations that immediately follow. The first one or two ice cream cones may still begin to drip faster than the customers can eat them. Typical of such an interlocked control is the one shown in Patent No. 2,304,094. Such usually involve a rod attached to the valve that extends quite a distance to reach a control switch that is located remotely where it avoids the dangers that would accompany electric circuits exposed to alternate freezing and thawing of condensate collecting on the dispensing head during refrigeration and dispensing cycles. Moreover, with such an interlock control the ice cream discharge valve can be operated generally in only one position.

With these difficulties and limitations in mind concerning conventional constructions it should be observed that one of the objects of the invention is the provision of a thermally insulated dispensing head and valve unit which has an electromechanical control located immediately adjacent thereto for actuation of the valve and control by a single handle that is operable from any position in front of the dispenser within a range of 180°, and with the handle locatable flat against the front of the freezer, out of the way, when not in use.

Another object of the invention is to thermally insulate the major portion of the exposed surface area of the unitary head and the internally exposed upper length of the valve housing to eliminate condensation on all surfaces above the level of the dispensing valve outlet from which condensate, if present, would run down to the dispensing service outlet.

A further object is to provide in contact with ice cream in the freezer a comparatively thin metal plate of stainless steel, of low heat conductivity, that is structurally rigidified by a narrow valve housing element across the center thereof with the element terminally exposed to atmosphere only beyond an intervening metal-to-metal contact with the freezer cabinet housing. The housing is thermally insulated from the freezer cylinder and therefore would supply sufficient thermal units from the atmosphere to the peripheral portion of the plate to obviate condensation thereon with minimum loss of refrigeration.

Another object of the invention is to provide the closure plate member in contact with ice cream in the freezer with a shape different from that of the freezer cylinder opening which it closes whereby wide expanses of the plate margins are warmed from the thermally insulated freezer cabinet to supply by thermal conduction heat units to narrow margins of the closure plate and obviate condensation of water on its marginal edge portion.

A further object of the invention is to provide a short distance for direct conductivity of thermal units from the dispensing nozzle to the refrigeration system of the freezer to maintain the ice cream temperature at the nozzle substantially the same as that in the freezer during intervals between dispensing while minimizing the area of the nozzle exposed to atmosphere to a narrow ring shaped end edge where condensation is minimal.

Still another object of the invention is to provide a dispensing head having a rotatable valve element which is easily movable vertically in any relative rotatable position by a fulcrumed lever from a fully closed position to a fully open position and may be rotatable for operator convenience at any level in any relative vertical position.

A further object of the invention is to provide a discharge head having a minimum number of moving parts, each of which can be readily removed individually with all passages wide open for brush cleaning with water and including a valve assembly which is retained to the dispensing head by a novel tang and slot arrangement which enables ready disassembly of the parts without any tools only when the head is removed.

Another object of the invention is to provide a discharge head which is simple in operation, economical to manufacture, yet meets the high standards of sanitation and performance required in the food dispensing industry.

The invention is characterized by an insulated closure or head unit supported on two diametrically spaced horizontal stud bolts and secured to the front of a freezer cylinder by decorative hand nuts. The head unit embodies all of the dispensing valve and mechanism with the handle rotatable to allow for its control from any direction in front of the dispensing head of the freezer. Vertical movement of the handle opens the dispensing valve and simultaneously actuates a novel electro-mechanical control to initiate rotation of the beater inside the freezing compartment and the circulation of refrigerant in the coils surrounding the freezer during the period of time ice cream is being withdrawn. This allows the freezer to cool and properly whip new mix admitted to the freezing cylinder to replenish that which is being withdrawn and continues until stopped by automatic temperature controls.

Other objects and advantages of this invention will become obvious from inspection of the following description and drawings in which:

FIG. 3 is a vertical sectional view of the dispensing head mounted to the freezer with the valve in the open position;

FIG. 4 is a fragmentary cross-sectional view showing the valve of FIG. 3 in the closed position; and FIG. 5 is a cross-sectional view through the head at the level of the center line of the beater mechanism.

Figure 2:
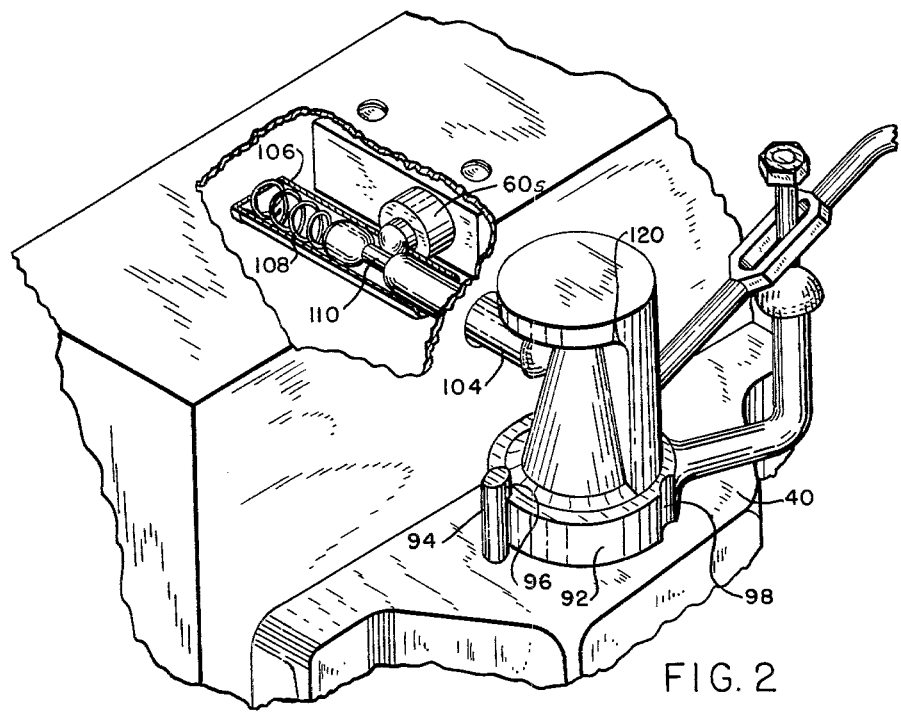
FIG. 2 is a partially sectioned perspective view showing the electro-mechanical control elements.
Figure 1:
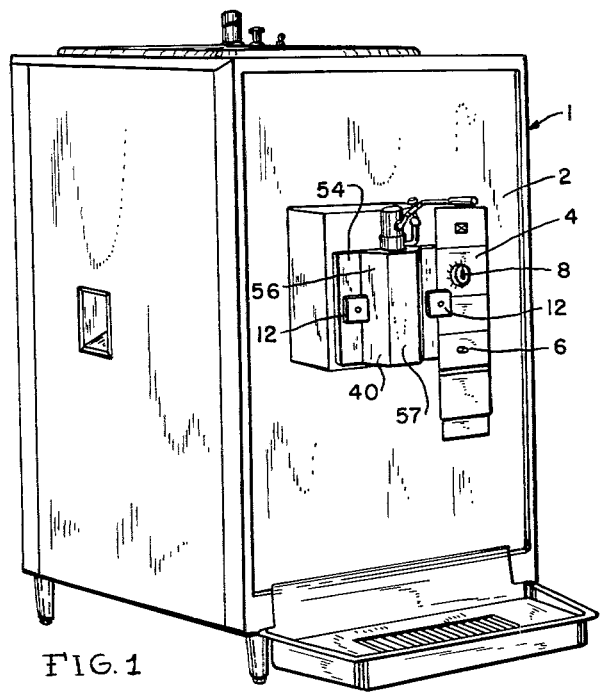
FIG. 1 is a perspective view of a freezer construction equipped with a dispensing head embodying the invention.

Referring now to the drawings, a soft ice cream dispensing machine is generally indicated at 1 having an outer thin wall or shell 2 of stainless or enamelled sheet metal.

A horizontal freezing cylinder 10 is provided therein having refrigeration (expansion) coils 20 brazed externally to its cylindrical wall 11 in intimate heat exchange relationship to freeze ice cream mix supplied to the cylinder from an external source (not shown). A beater 30 within the cylinder whips the ice cream mix as it is being frozen to insure a light, smooth-textured soft ice cream product. A spiral blade 36 moves the soft ice cream towards the dispensing end of the cylinder.

A discharge head 40 which will be further described in more detail is secured to the front of the freezing cylinder 10 by stud and nut assemblies 12. An annular gasket 42 carried in a groove 44 provided in the inner face of the discharge head 40 assures a leak-tight fit when the nuts 12 are tightened on the studs.

An electrical control panel 4 located on the front of the machine adjacent to the discharge head 40 is provided with a selector switch 6 which will place the machine in one of two operating modes. One mode called "clean-out," operates only the beater 30 and is used, as the name implies, to clean out the freezer when flushing water and other washing fluids through the freezing cylinder.

Figure 6:
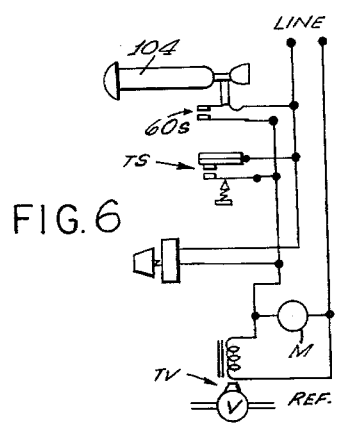
FIG. 6 is a diagrammatical representation of the motor and refrigerant control circuit controlled during dispensing operation.

The other mode, called "automatic," also controls both the beater and the refrigerant, and through a thermostatic control TS turns on both the beater motor M and the refrigerant valve TV as required during operation to maintain the ice cream in a desired soft frozen state for consumption. A microswitch 60S controlled by the discharge head valve mechanism, which will be further described later, is also electrically connected to this conventional circuit diagrammatically shown in FIG. 6 to actuate the beater and initiate circulation of the refrigerant each time ice cream is withdrawn through the discharge head. A second switch 8 is also located on the panel and has a timing mechanism to provide for an initial cool-down period at the start of a day's operation.

The dispensing head unit 40 comprises a base plate 50 to which is attached a formed cover housing 52. The cover housing 52 is made of sheet metal stock having lateral portions 54 substantially parallel to plate 50 and inclined walls 56 defining a recessed portion 57 that is convex when viewed externally. A flange 58 on the cover plate is used to join it to the base plate by welding or other suitable means. A hollow discharge head is thus formed which can be filled with an insulating material 60 in any conventional manner to minimize heat transfer from the freezer cylinder and base plate 50 to the outer portions of the discharge head.

A vertically disposed bar 70 is mounted to the base plate within the hollow portion just described and has a central bore 72 therethrough forming a cylinder to receive a piston valve 80. A bore 74 through base plate 50 and one side of the bar 70 intersects the bore 72 providing communication with the interior of the freezing cylinder 10. A reduced end portion 32 of the beater shaft 34 having a helical blade 36 thereon is journalled in a recess 38 in the plate 50 and bar 70 as positioned by shoulder 39 to rotate clockwise in the direction of the arrow 37 and forcibly feed soft frozen ice cream into the valve inlet bore 74. Raising piston valve 80 by means of handle 78 exposes bore 74 and allows the frozen product to move from the freezing cylinder through bores 74 and 72 to a receiving container such as a dish or cone for serving customers. It will be observed that the lower end of the bore 80 is enlarged as at 82 to receive a decorative ejection nozzle 84.

Referring now to FIGS. 2, 3 and 4, an externally rounded reduced portion 90 of bar 70 protrudes through the top of the discharge head 40. A collar 92 is rotatably mounted thereon and is provided with an arm 85 which has a rounded supporting surface 86 for the central part of the handle 78. One end of handle 78 rests in a recess 87 in piston valve 80. Grasping the opposite or manual end 88 of the handle one can easily raise and lower the piston valve due to the class one lever and fulcrum action on the support surface at 86 as guided by a reduced end portion 89. Further, since both the piston 80 and sleeve 92 are rotatable the handle and valve can be swung horizontally around the axis of the valve piston 80 to any one of a number of positions in front of the freezer to allow a dispensing of ice cream by an operator standing to either side of the machine as well as directly in front of it.

An upstanding pin 94 secured to the shell 2 of the freezer has a projecting arm 96 which retains sleeve 92 against accidental dislodgement. A vertical groove 98 on the sleeve allows easy removal of the sleeve when the sleeve is rotated to position the groove beneath arm 96. Nut 76 threaded to arm 85 likewise removably retains handle 78. The various valve elements thus are easily disassembled for cleaning and sterilization.

It should be noted in this regard that the preferred location of groove 98 is immediately adjacent to the arm 85 so that the discharge head 40 must be removed from the freezer 10 before the collar can be rotated sufficiently to line up the groove 98 beneath the arm 96. In this way accidental dislodgement cannot occur during normal operation yet ready disassembly without any tools is assured when the head is removed. Moreover, cleaning of the head requires its removal which exposes the cylinder for cleaning, and vice versa. Thereby cleaning is easy and complete.

Piston valve 80 has a conical camming surface 100 adjacent to its upper end which extends about 180° around the piston. The conical surface ends in a reverse taper or shoulder 102 which extends back to the original circumference. The camming surface 100 co-operates with a spherically headed pin 104 which is retained in a housing 106 secured to the outer shell 2 of the freezer.

The pin 104 is urged toward the camming surface by a compression spring 108. When the piston valve is raised, as previously described, pin 104 is forced back into the housing 106 by the camming surface 100 as best seen in FIG. 3. Pin 104, in turn, activates microswitch 60S which normally rests against a reduced portion 110 of pin 104.

The sequence just described will occur in any position of rotation which the piston valve is in up to 90° either side of center. Rotation of the piston valve any further distance is limited by vertical walls 120 at either end of the conical surface which coact with pin 104 to act as stops to prevent further rotation.

It will be observed from the description how the various objects stated are attained but it can be further noted that the plate 50 is square and covers a round opening in the cylinder 11. Thus there are wide expanses at the corners of the plate 50 that contact the front portion of the shell 2 which are insulated from the freezer coils 20. This is corollary to insulating the freezer, and with the shell portion contacted warmer than the plate 44, the temperature of the plate at its edge is brought above the dew point of the atmosphere generally present in dairy bars.

Moreover, the heat exchange relationship between the plate 50 and the bar 70 will also bring the upper end of the bar to a temperature above the dew point at its surface because of a low coefficient of conductivity in the bar and the fact that the shell of the head will also supply thereto heat adsorbed from the atmosphere assures little if any condensation over the major portions of the head.

On the other hand, at the bottom of the bar the distance is quite short between the freezer cylinder and the outlet opening and the ice cream flows through a decorative column forming nozzle 84. Thus, the dispensed ice cream will be kept cold and any condensation that may occur is quite limited and is where it will not contaminate or interfere with dispensing operation.

Dismantling the head for cleaning is very quickly accomplished, the two decorative nuts of the stud and nut assemblies 12 are removed, leaving the studs supporting the head. The head 40 is then slipped from the studs; the handle 78 is turned until the arm 96 and groove 98 coincide whereupon the piston valve 80 is withdrawn; and, the freezer cylinder being open with removal of the head 40 the beater 30 is withdrawn. All parts contacted by ice cream can be washed and brush scrubbed including the passages 72 and 74. Reassembly is accomplished readily by reversing the steps noted.

Having thus described the invention and its many advantages as disclosed in its preferred embodiment, it will be readily seen by those skilled in the art how various and further changes can be made within the objects stated without departing from the spirit of the invention, the scope of which is commensurate with the appended claims.

What is claimed is:

1. A discharge head for a dispensing type icre cream freezer having an inner wall and an outer wall with insulation therebetween; passage means in the discharge head leading from the interior of the freezer through both walls to the exterior for ejection of frozen ice cream; a vertical piston valve in the discharge head controlling the flow of ice cream through the passage means; a rotatable collar on the discharge head encircling said piston valve; handle means carried by said collar to operate the piston valve from a number of positions horizontally around the front of the discharge head as the collar is rotated; a vertical slot on said collar; an upstanding member carried by said discharge head; and projecting means on said upstanding member extending over and retaining said rotatable collar throughout a major portion of its rotation during dispensing operation, said vertical slot and said projecting means coinciding beyod the limits of rotation of dispensing operations.

2. In an ice cream freezer of the continuous dispensing variety having a storage compartment and a freezing chamber wrapped with refrigeration coils to freeze the ice cream mix therein, a beater in the freezing chamber to whip the mix as it is being frozen, the improvement comprising: an insulated discharge assembly mounted on the end of the freezing chamber and having a first member acting as one wall of the freezing chamber; a second member having a portion substantially parallel to and spaced from said first portion and fastened at its peripheries to said first member; an insulating media between said first and second members acting to reduce heat transfer between the members; passage means in said discharge assembly communicating between the interior of the freezing chamber and a discharge port, a vertical piston valve in said discharge assembly to control the flow of frozen ice cream mix through said passage means; control means actuated by the opening of said vertical piston valve to initiate flow of refrigeration through said coils and rotation of said beater to freeze replenishing mix added to the freezing chamber as frozen mix is withdrawn through the valve; rotary handle means associated with said piston valve to allow operation of said valve from a number of positions in front of said freezing chamber; and stop means associated with said piston valve to limit the rotation of said rotary handle means to an arc of less than 270°.

3. In combination of soft ice cream freezer comprising a horizontally disposed refrigerated freezing cylinder having an opening at one end, a motor driven beater mechanism in said cylinder receivable through said opening and having blade means adjacent to the opening for moving soft frozen ice cream towards said opening, a closure head unit for said opening including a closure plate, means for sealing the closure plate around said opening, a vertical member secured to said plate having a valve chamber therethrough with an ice cream discharge opening at the lower end, means for journalling the front end of said beater mechanism upon the plate and member, said plate and member having a discharge port at the bottom of the cylinder opening into the valve chamber, a valve member slidably mounted in said valve chamber to close said port and move ice cream through the discharge opening in its lowered position, a finishing shell over and spaced horizontally from the outer surfaces of said plate and member, and thermal insulation means in said space between said shell and said plate and member.

4. The combination called for in claim 3 in which the upper end of said valve member has an axially inclined cam thereon, and switch means for activating the motor driving said beater having an activitating arm actuated by said cam when said valve member is raised.

5. The combination called for in claim 3 in which said freezer includes a housing around said opening of said freezing cylinder, means for thermally insulating said housing from said freezing cylinder, said closure plate marginally engaging said housing over a substantial area thereof beyond said insulating means.

6. A discharge head for an intermittent dispensing ice cream freezer having a freezing compartment and motor driven beater therein said head having a vertical passage therein in lateral communication through a port with said compartment, a vertical piston valve means rotatably and reciprocably mounted in said passage to close said port; a frusto-conical portion on said valve means adjacent to the top thereof and extending approximately 180° and less than 270° around the valve means; a horizontal plunger on said freezer operatively connected and biased toward the reduced end of said frusto-conical portion; valve opening means to move the valve means to an open position and laterally move the horizontal plunger through a camming action of the frusto-conical portion; and an electrical switch actuated by movement of the horizontal plunger when the valve is opened to activate the motor and beater during dispensing operation.

7. A discharge head for mounting on a dispensing ice cream freezer having a freezing cylinder and a motor driven beater therein and comprising a closure plate and a shell spaced from said plate, thermal insulating means therebetween; a vertical valve cylinder mounted between said plate and shell having an inlet port in communication with the freezing cylinder and an outlet discharge port dispose within said shell; a piston valve reciprocably mounted in said valve cylinder for movement to a raised position opening said inlet port and to lowered position closing said inlet port to discharge ice cream between said ports through the discharge port and having a frusto-conical portion adjacent to the top thereof; a plunger member mounted on the freezer and operatively engaging said piston at the upper reduced end of said frusto-conical portion when the valve is closed; beater motor control means for the freezer actuated upon movement of said plunger including an electrical switch; biasing means to urge said plunger from its switch actuating position, said plunger being moved to a switch actuating position by the raising of said piston through contact with said frusto-conical surface.

8. A dispensing ice cream freezer having a freezing chamber with a motor driven beater therein and a discharge head comprising a closure plate member secured to said chamber; a housing member secured to said plate member and having portions spaced therefrom; thermal insulating means in said space between said members, a vertical valve cylinder mounted between said members intersecting a bore through the plate member and having a discharge opening to provide a communication between said chamber and said discharge opening; a piston valve axially and rotatably mounted in said valve cylinder to open and close said bore and having a tapered conical surface adjacent to the top of the piston; a sleeve member rotatably secured to an upper portion of said cylinder; an arm on said sleeve member; a handle operatively attached at one end to the piston valve and movably secured to said arm at a point spaced from said one end in fulcrumed relationship; and electro-mechanical switch means actuated by said tapered surface to initiate the motor for rotation of the beater during the time the piston valve is open.

9. In combination of a soft ice cream freezer comprising a horizontally disposed refrigerated freezing cylinder having an opening at one end, a beater mechanism in said cylinder receivable through said opening and having blade means adjacent to the opening for moving soft frozen ice cream towards said opening, a closure head unit for said opening including a closure plate, means for sealing the closure plate around said opening, a vertical member secured to said plate having a valve chamber therethrough with a discharge outlet at the lower end, means for journalling the front end of said beater mechanism upon the plate and member, said plate and member having an outlet port at the bottom of the cylinder opening into the valve chamber, immediately above said discharge outlet, a valve member slidably mounted in said valve chamber to close said port in its lowermost position and discharge soft ice cream through said discharge outlet on its downward port closing movement, a finishing shell over said spacing horizontally for the outer surfaces of said plate and member, thermal insulation means in said space between said shell and said plate member, said vertical member being of reduced cross-sectional dimension at the top and exposed at atmosphere as a thin ring, a sleeve rotatable on said ring, and a handle supported on said ring and engaging the valve member for raising it to open said port.

References Cited by the Examiner

UNITED STATES PATENTS

| | | | |
|---|---|---|---|
| 1,977,292 | 10/1934 | Segal | 222—75 X |
| 2,488,688 | 11/1949 | Knibb | 62—342 |
| 2,737,024 | 3/1956 | Swenson | 62—342 X |
| 3,052,103 | 9/1962 | Clark | 62—323 X |
| 3,172,422 | 3/1965 | Koch | 137—375 |

FOREIGN PATENTS 852,999  11/1960  Great Britain.

ROBERT A. O'LEARY, *Primary Examiner.*

W. E. WAYNER, *Assistant Examiner.*